Patented June 6, 1939

2,161,751

UNITED STATES PATENT OFFICE 2,161,751

ROTOGRAVURE INK

Roy Allen Shive, Bound Brook, Joseph Ellis Coffee, East Orange, and Roy Herman Kienle, Bound Brook, N. J., assignors to The Calco Chemical Company, Inc., Bound Brook, N. J., a corporation of Delaware No Drawing. Application October 12, 1936, Serial No. 105,290

4 Claims. (Cl. 134—36)

This invention relates to intaglio printing inks and to bases for such inks.

The use of intaglio or rotogravure printing is rapidly increasing but serious difficulties are encountered with the ink which must adhere to the surface which is being printed, leave the engraved plate cleanly and dry sufficiently rapidly so that it will not smear or run. The problem becomes increasingly difficult when higher printing speeds are used, and, of course, the cost of printing is greatly decreased when the presses can operate at higher speeds.

Another difficulty is involved in printing on certain surfaces which do not readily take ink such as metals, Cellophane and the like.

The present invention solves the problem presented by rotogravure printing and particularly high speed printing by using an ink base which contains as its main solid binding ingredient chlorinated rubber. It is, of course, known to use a solution of chlorinated rubber as a paint or coating but the surprising effects which are obtained when chlorinated rubber is used in a rotogravure ink are entirely different from the characteristics possessed by rubber paints or lacquers.

The present invention is applicable to all types of intaglio inks both those made with pigments and those made with dyes. The consistency of the ink will, of course, vary with the particular conditions of printing. It is an advantage of the present invention that cheap solvents such as toluene and xylene may be used and no expensive solvents are necessary, thus, the ink produced by the present invention not only produces an intaglio ink of remarkable properties permitting printing speeds never hitherto achieved but the cost of the ink is not materially greater than the inks which have hitherto been used and which have been unsatisfactory especially for high speed printing.

The present invention may be carried out by making up the ink or by making up concentrated solutions which can be thinned or by forming colored solid powders which can be readily transported and kept and which disperse in the hydrocarbon solvents to form ink. This product is particularly advantageous where the user is at a considerable distance from the manufacturer as the difficulties and additional expense of shipping liquid ink is avoided, also the fire hazard which, of course, is present with any printing ink having inflammable hydrocarbon solvents is avoided.

The present invention includes inks in which the chlorinated rubber is the only base but in a more specific aspect there are included special inks or ink bases in which the chlorinated rubber is admixed with synthetic resins particularly alkyd resins of the oil or oil acid modified type. These special inks, containing both chlorinated rubber and synthetic resin, show ready adherence to smooth metal surfaces which permits the printing on metal foils at high speed. The combined chlorinated rubber and resin inks are also very effective for printing on Cellophane. In fact, the present invention opens up a new field for high speed rotogravure printing. Hitherto it has not been feasible to print Cellophane or metal surfaces at high speed because it is not possible to obtain a satisfactory sharpness and hence slower speed printing and high proportions of rejects have resulted. The present invention completely obviates this difficulty and permits producing beautiful printing effects on the highly reflecting metal and Cellophane surfaces.

While the ink is particularly designed for intaglio printing it may also be used for fast drying letter press and screen process printing. The dry colored powder, of course, can be used for making inks of any type by using the necessary vehicles.

It is another advantage of the present invention that the solvent retention is very low despite rapid drying. As a result, there is little danger of smearing the dried printing under pressure. All these properties are obtained without losing the desirable features of clean wiping from the engraving and self-lubrication which are especially notable in the inks of the present invention.

Chlorinated rubber, of course, is not a definite standard chemical. It has been found that the inks of the present invention can be made satisfactorily with a product sold by the Hercules Powder Company under the trade name "Tornesit". The invention is, however, not limited to this particular product but any chlorinated rubber of similar physical characteristics may be used. The fact that it is not necessary to use a chlorinated rubber specially prepared for the purpose is an advantage of the present invention as it permits using standard commercial products which are available at moderate prices.

The rotogravure inks of the present invention possess further advantages in that after drying the coating formed is not thermoplastic and therefore there is no tendency to smear if the material printed is brought into contact with warm surfaces. This is an important advantage as the inks which have been used hitherto produce a film which is permanently thermoplastic.

Another advantage of the invention lies in the fact that the inks produced are very much less abrasive than similar rotogravure inks. This is of importance as in many cases the best color is obtained by using a pigment rather than a dye which pigment frequently is comparatively abrasive. Of course, a highly abrasive ink is undesirable as it tends to wear the rotogravure plate or cylinder very rapidly and as this type of printing is frequently employed in reproducing very large numbers of impressions, for example, when printing labels, package wrappings, and the like, it is an important advantage of the present invention that the abrasiveness of abrasive pigments is to a very large extent eliminated. Of course, even with the present invention it is not possible to make a completely nonabrasive ink with a highly abrasive pigment, but it is possible to make inks from abrasive pigments which will give a satisfactory light to the rotogravure plate or cylinder, where as if the same pigments were used in the rotogravure inks which have been produced up to the present time, the resulting product would be so abrasive as to be unusable. We have not definitely determined the exact reason why the present invention so greatly reduces the abrasiveness of abrasive pigments. We therefore do not wish to be limited as to this feature of the invention by any theoretical explanation. Although we believe that it is probable that at least an important factor is the cushioning effect of the elastic chlorinated rubber film which probably coats these individual abrasive pigment particles and eliminates many of the sharp edges or corners.

The invention will be described in the specific examples in conjunction with dyes and pigments which are not diluted. For many inks this is desirable. However, in some cases for reasons of economy or to produce more desirable shades, it may be advantageous to use pigment extenders or substrates such as, for example, barium sulfate, aluminum hydroxide and other well known extenders. The use of extenders with pigments is, of course, well known in the pigment art and any such extended pigments may be used in conjunction with the present invention. It is an advantage that where abrasive extenders are used the feature of the present invention described in the preceding paragraph, renders the inks made with such extended pigments, less abrasive.

The invention will be described in greater detail in conjunction with the following specific examples which illustrate typical embodiments of the invention but which do not limit it to the details therein set forth.

Example 1

A mixture of 20 lbs. of ultramarine blue, 8 ozs. of carbon black are ground for 72 hours in a ball mill in a 40% solution of chlorinated rubber (sold on the market as "Tornesit") the composition being as follows:

9 lbs. 9 ozs. 20-centipoise "Tornesit'
7 lbs. 3 ozs. toluene
14 lbs. and 6 ozs. of an equal mixture of toluene and xylene.

After grinding is completed the ink is thinned with about 14 lbs. of toluene to the proper consistency for intaglio printing. This formula can be used for printing either on paper or on Cellophane. Other aromatic solvents may be used in place of toluene for thinning purposes.

Example 2

6 lbs. of gold bronze powder is stirred into a 25% solution of 125-centipoise "Tornesit" in a mixture of equal parts of toluene and xylene. The solution contains 2 lbs. of chlorinated rubber. Stirring is continued until the ink becomes uniform and it is then further thinned with toluene to the desired consistency. The formula can be used for printing either on paper or Cellophane.

Instead of using 125-centipoise "Tornesit" 20-centipoise "Tornesit" may be used with equally good results.

Example 3

1 lb. 4 ozs. of monophenylditolylmetnanetetrazophenylmethylpyrazolone is dissolved in a 25% solution of 20-centipoise "Tornesit" containing 5 lbs. of chlorinated rubber in an equal mixture of toluene and xylene. After solution the ink is thinned with toluene to the desired consistency and then gives good printing on paper, Cellophane or coated metal foil. The formula is a very strong yellow color and for process work a more dilute solution should be used. That is to say, a smaller amount of dye should be incorporated with the chlorinated rubber.

Example 4

10 ozs. of monophenylditolylmethanetetrazobetanaphthol is dissolved in a 25% solution of chlorinated rubber (20-centipoise "Tornesit"), containing 3 lbs. of chlorinated rubber in equal parts of toluene and xylene. The ink, when thinned to printing consistency with toluene, prints readily on paper, Cellophane or coated metal foil. It is also a very strong ink and the dye content should be reduced for process work as described in Example 3.

Example 5

10 ozs. of Victoria blue base (Color Index 729), ½ oz. of Victoria green base (Color Index 657) and 1 lb. 3 ozs. oleic acid is dissolved in a 25% chlorinated rubber solution containing 6 lbs. 1 oz. chlorinated rubber. When thinned with toluene or other aromatic thinners to printing consistency it prints readily on paper, Cellophane or coated metal foil. This ink, just as those of Examples 3 and 4, has a very high color strength and requires reduction for process work.

Example 6

8 oz. of monophenylditolylmethanetetrazophenylmethylpyrazolone is mixed with a solution containing 1.8 lbs. chlorinated rubber (20-centipoise "Tornesit") .2 lb. of an air drying alkyd resin containing 50% of an oxidizing acid, 3 lbs. of toluene and 3 lbs. of xylene. After thorough admixture the ink is cut 50% by volume with toluene to printing consistency. Excellent adhesion is obtained on smooth metal surfaces, the adhesion being better than when the resin is not present.

The yellow dye used is a typical oil soluble dye stuff, of course, any other oil soluble dye or pigment may be substituted in the formula.

Example 7

60 parts of dry ultramarine and 90 parts of 20-centipoise chlorinated rubber are blended dry and the blend slowly added to a rubber mill with steam heated rubber rolls, the mixture being wet down with high flash naphtha in order to produce an easily working plastic mass. About 30 parts of high flash naphtha are required for the milling operation which is continued until a smooth, uniform sheet is obtained which is brittle and grindable when cold. The product is cooled, ground to a fine powder and can be made into ink by simple solution. A typical formula is 40 parts of the pigmented powder, 30 parts of toluene and 30 parts of xylene.

Other inorganic or organic pigments can be substituted for the ultramarine. The high flash naphtha may be substituted partly or wholly by other solvents such as xylene, methyl abietate, etc. If desired the solvent can be carefully removed on the rolls but care must be taken to keep the temperature so that it will not injure the chlorinated rubber.

Example 8

15 parts of monophenylditolylmethanetetrazobetanaphthol are dry blended with 85 parts of chlorinated rubber (20-centipoise "Tornesit") 15 parts of the high boiling aromatic solvent such as xylene are slowly stirred into the blend to form a meal which is then worked to a smooth uniform sheet on steam heated rolls in a rubber mill. After cooling the cold product is ground to a powder which can be dissolved in aromatic hydrocarbons to produce a fast drying intaglio ink.

Example 9

3 oz. of carbon black and 12 oz. of heat treated China-wood oil ground in a roller mill and then 24 oz. of an oil soluble nigrosine, 4 lbs. 8 oz. 20-centipoise "Tornesit", 6 lbs. 12 oz. toluene, 6 lbs. 12 oz. xylene are mixed in to form a black ink which can then be thinned to printing consistency with toluene. The resulting product can be used for printing on paper, Cellophane or coated metal foil.

Example 10

10 lbs. of barium lithol toner are ground in a ball mill with 10 lbs. 20-centipoise chlorinated rubber, 15 lbs. toluene and 15 lbs. xylene. The resulting red ink should be thinned to printing consistency with toluene or xylene.

Example 11

2724 parts by weight of toluene, 1362 parts chlorinated rubber and 135 parts of benzoic acid are stirred until a smooth mixture is obtained and then 400 parts of Blue base R, described below, are added and agitation continued for 1 hour. The product is then allowed to stand for 4 days to reach an equilibrium as a finished ink.

The Blue base R is prepared by heating 300 parts by weight of Spirit blue base (Color Index 689) and 600 parts of linseed fatty acid to 75-80° C. for 1 hour followed by two passes over a three roller mill.

Example 12

A base is prepared by mixing 1500 parts by weight of the resin produced as a still residue in the production of betanaphthol. 150 parts of chlorinated rubber, 600 parts of hydrogenated gasoline and 2550 parts of toluene. The mix is slowly heated to 105° C. cooled to 95° C. and then 48 parts of a 40% formaldehyde solution are added and the mixture filtered. 100 parts of the above vehicle dissolved, 2.5 parts of Bismarck brown base (Color Index 332) to form a brown rotogravure ink suitable for the highest speed rotogravure printing. The betanaphthol still residue imparts great light fastness to the otherwise highly fugitive Bismarck brown. We do not claim as our invention this effect of betanaphthol still resin on fugitive dyes. The present application, however, includes inks made with chlorinated rubber and the resin stabilized dyes.

Example 13

A white ink is prepared by mixing 781 parts of basic carbonate white lead, 681 parts of titanium oxide, 545 parts of chlorinated rubber, 1271 parts of toluene, 454 parts of xylene and 3 parts of ultramarine. After thorough mixture, an ink results which gives good white printing and which inks can be used in composition by varying the quantity of toluene and xylene to meet the requirements of different printing speeds.

The foregoing examples set forth various typical modifications of the invention and are intended to illustrate the use of various extenders, thinners, synthetic resins, drying oils and the like with the chlorinated rubber. The invention is, of course, in no sense limited to the particular combinations set forth in the examples and, of course, the extenders of one example can be used in another, etc. In every case the best mixture will be used depending on the particular conditions and the color required. It is an advantage of the present invention that it is very flexible and can be used for any rotogravure or intaglio ink.

What we claim is:

1. An intaglio printing ink comprising a color, a hydrocarbon solvent of the benzene series having a boiling point not higher than that of xylene and chlorinated rubber, the percentage solids of chlorinated rubber being between about 1% and about 30% and the ink not containing more than about 6% of a drying oil fatty acid.

2. An intaglio printing ink comprising a pigment, a hydrocarbon solvent of the benzene series having a boiling point not higher than that of xylene and chlorinated rubber, the percentage solids of chlorinated rubber being between about 1% and about 30% and the ink not containing more than about 6% of a drying oil fatty acid.

3. An intaglio printing ink comprising an oil soluble dye, hydrocarbon solvent of the benzene series having a boiling point not higher than that of xylene and chlorinated rubber, the percentage solids of chlorinated rubber being between about 1% and about 30% and the ink not containing more than about 6% of a drying oil fatty acid.

4. An intaglio ink capable of good adhesion on metal and Cellophane surfaces comprising a color, chlorinated rubber, an alkyd resin and a hydrocarbon solvent of the benzene series having a boiling point not higher than that of xylene, the percentage solids of chlorinated rubber being between about 1% and about 30% and the ink not containing more than about 6% of a drying oil fatty acid.

ROY ALLEN SHIVE.
JOSEPH ELLIS COFFEE.
ROY HERMAN KIENLE.